May 28, 1957 G. MANIERRE 2,793,731
MOBILE CONVEYER MACHINES
Filed Aug. 5, 1953 8 Sheets-Sheet 3

INVENTOR
GEORGE MANIERRE
BY Christopher J. Waal
ATTORNEY

May 28, 1957     G. MANIERRE     2,793,731
MOBILE CONVEYER MACHINES
Filed Aug. 5, 1953          8 Sheets-Sheet 5

INVENTOR
GEORGE MANIERRE
By Christopher L. Waal
ATTORNEY

May 28, 1957 G. MANIERRE 2,793,731
MOBILE CONVEYER MACHINES
Filed Aug. 5, 1953 8 Sheets-Sheet 7

INVENTOR
GEORGE MANIERRE
BY Christopher L. Waal
ATTORNEY.

United States Patent Office 2,793,731
Patented May 28, 1957

2,793,731

MOBILE CONVEYER MACHINES

George Manierre, Milwaukee, Wis.

Application August 5, 1953, Serial No. 372,545

15 Claims. (Cl. 198—2)

The present invention relates to mobile conveyer machines of the articulated type for handling articles such as bags, barrels, boxes and the like, and adapted for use in loading and unloading box-cars and other enclosures.

An object of the invention is to provide a conveyer machine of this character having improved means for driving and guiding flexible conveyer means thereof and for taking up the slack which develops in the conveyer means during the articulating movements of the machine.

Another object is to provide an articulated conveyer machine which can be made of considerable length while still insuring smooth operation of the flexible conveyer means in either direction and affording ample take-up travel.

Still another object is to provide an articulated conveyer machine having improved slack take-up means which also mounts an extension conveyer of the machine.

A further object is to provide an articulated conveyer machine which is adapted to be loaded and unloaded at either end and which is adjustable in height at each end.

A still further object is to effect improvements in the general type of conveyer machine disclosed in my Patent 2,250,933 for Loading Conveyer, issued July 29, 1941.

The invention further consists in the several features hereinafter described and claimed.

In the accompanying drawings.

Figure 1:
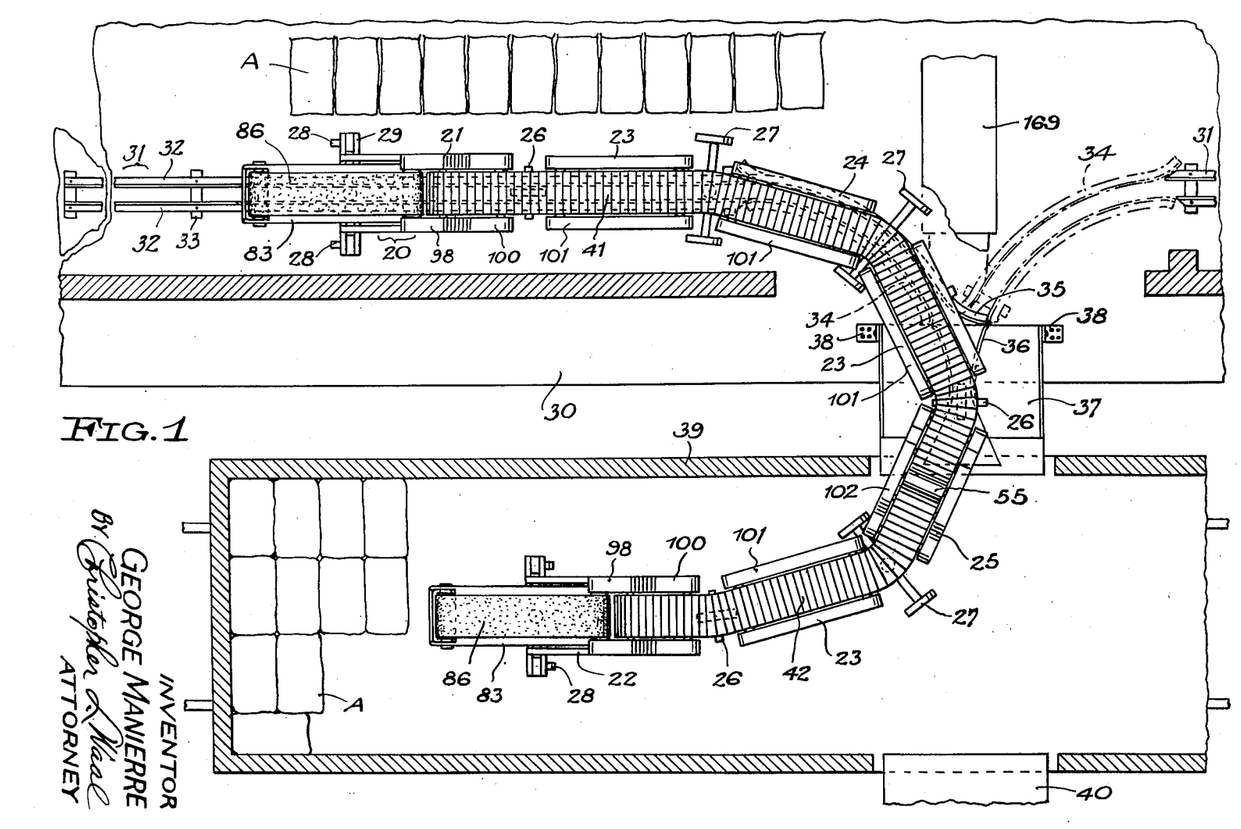
Fig. 1 is a plan view of a mobile conveyer machine of the invention showing it in use in loading and unloading a box car.
Figure 2:
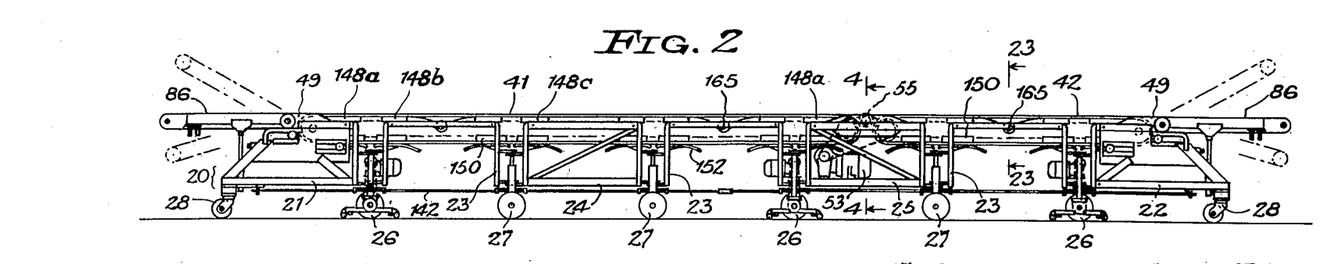
Fig. 2 is a side elevational view of the machine, swingable end conveyers of the machine being shown in various positions in full and broken lines.

In the drawings, the conveyer machine is illustrated as a whole in Figs. 1 and 2 and includes a flexible, articulated, wheeled frame 20 consisting of a plurality of tandem or series-connected frame sections. By way of example, the frame is shown to consist of seven sections, although the number of frame sections may vary. In the present instance, the frame includes opposite end sections 21 and 22 of rigid type, which are of identical construction. Interposed in the following order between the end sections, progressing from left to right in Fig. 2, are an intermediate section 23 of hinged type, an intermediate section 24 of rigid type, another intermediate section 23 of hinged type, an intermediate section 25 of rigid type, and a further intermediate section 23 of hinged type, the rigid and hinged-type sections alternating in the series. Each frame section is pivotally connected with the adjacent section for horizontal movement to impart flexibility to the frame as a whole. The frame is supported at its pivotal connections by wheeled trucks 26 and 27, swingable on vertical axes and arranged as hereinafter described, and each end frame section is further supported by a pair of caster trucks 28 mounted on the ends of a cross beam 29 of this frame section. The trucks 26 are power trucks, here shown to be of a one-wheel type, and the trucks 27 are idler trucks, here shown to be of a two-wheel type.

Figure 3:
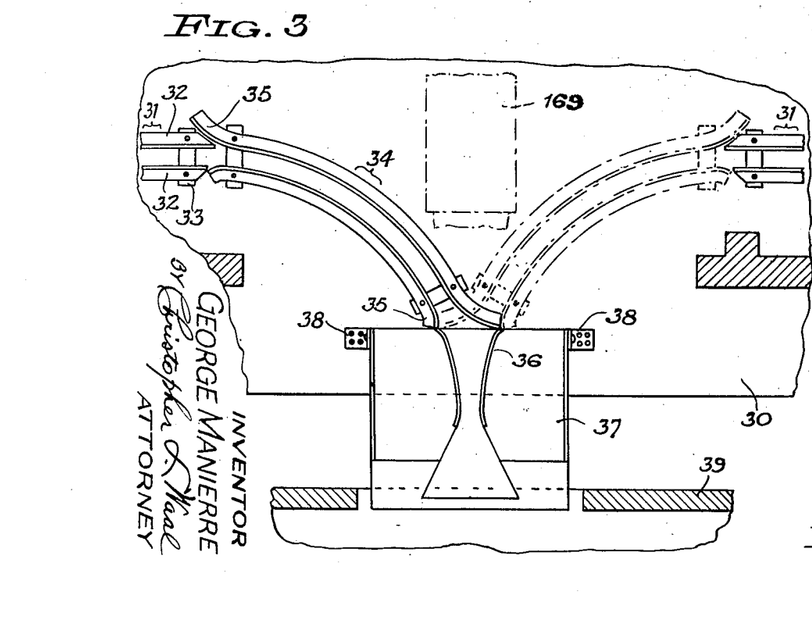
Fig. 3 is a top plan view of trackways for the machine.
Figure 4:
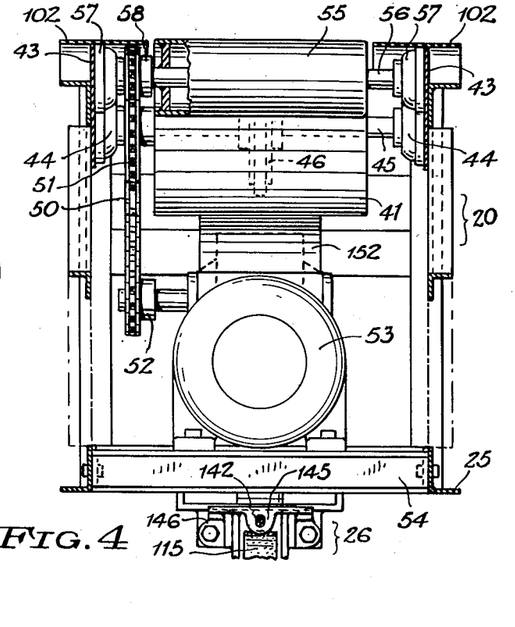
Fig. 4 is a transverse vertical sectional view of the machine, taken generally on the line 4—4 of Fig. 2.

As best seen in Figs. 1 and 3, a loading platform 30 has mounted thereon channel-shaped guide tracks 31 each preferably consisting of spaced parallel angle bars 32 connected by tieplates 33. A similarly constructed arcuate guide track 34 with flared ends 35 has one of its ends joining either of the ends of the tracks 31. The other flared end of the arcuate guide track 34 joins a flared guide track 36 formed on a bridge plate 37 which has hinged mountings 38 on the loading platform 30 and which spans the gap between the platform and the floor of a box car 39 to provide a runway for the supporting wheels of the conveyer machine. When the conveyer machine is withdrawn from the car, the plate 37 may be swung upwardly about its hinge mountings, free of the car. Similar bridge plates 40, one being shown, span the gaps between adjacent box cars, whereby the machine may be moved therein to successively load or unload the cars.

The conveyer machine includes manually controlled power-operated means, hereinafter described, for moving the machine into and out of the box car. After the machine is moved into a far end of the car, it can be backed out intermittently as the car end is loaded. After one end of the car is loaded, the conveyer machine is moved into the other end, and, as the loading progresses is intermittently backed out. The center of the car is then loaded, as the conveyer machine is being progressively withdrawn. During unloading of the car the conveyer machine is intermittently advanced into each end of the car.

Endless conveyer means is carried on the articulated conveyer frame and extends substantially from end to end thereof. In the present instance the conveyer means comprises a pair of endless chain conveyers 41 and 42 arranged in tandem relation and having upper and lower runs supported and guided as hereinafter described. The intermediate frame section 25 includes longitudinally extending top bars 43 at opposite sides mounting spaced vertical side plates 43' which have bearings 44 receiving the ends of a pair of transversely extending horizontal shafts 45, the shafts being spaced longitudinally of the frame section and disposed in the same horizontal plane. The shafts 45 carry respective drive sprockets 46 around which the chain conveyers 41 and 42 are respectively trained. At the end portions of the machine the chain conveyers are trained over respective idler sprockets 47 which are mounted on respective horizontal cross shafts 48 journalled in respective take-up carriages 49 hereinafter more fully described.

The adjacent shafts 45 are driven in the same direction and at the same speed through a transmission chain 50 which is trained over sprockets 51 on the shafts and over a sprocket 52 on a reversible electric motor 53 of the gear-head type, the motor being adjustably secured to a mounting plate 54 in the frame section 25. A cylindrical transfer roll 55 extends parallel to the drive shafts 45 in the space between the bights of the chain conveyers and is carried on a shaft 56 the ends of which are journalled in bearings 57 secured to the frame plates 43. The shaft 56 is provided with a sprocket 58 driven by the transmission chain 50, the peripheral speed of the roll preferably being higher than the linear speed of the chain conveyers, and the top of the roll preferably extending slightly higher than the plane of the top runs of the conveyer chains. The roll 55 serves to insure smooth transfer of the articles from one chain conveyer to the other during the operation of the machine.

The chain conveyers are universally flexible to a sufficient degree to allow free movement thereof about any curvature assumed by the flexible conveyer frame, the pivotal connections between the chain conveyer links 59 being arranged to provide this flexibility. Each chain conveyer includes a plurality of substantially rectangular flights 59' each offset longitudinally to partly underlie the next adjacent flight so as to provide a relatively smooth top surface and to avoid interference with the lateral flexing of the conveyer.

Figures 5, 6, 7:
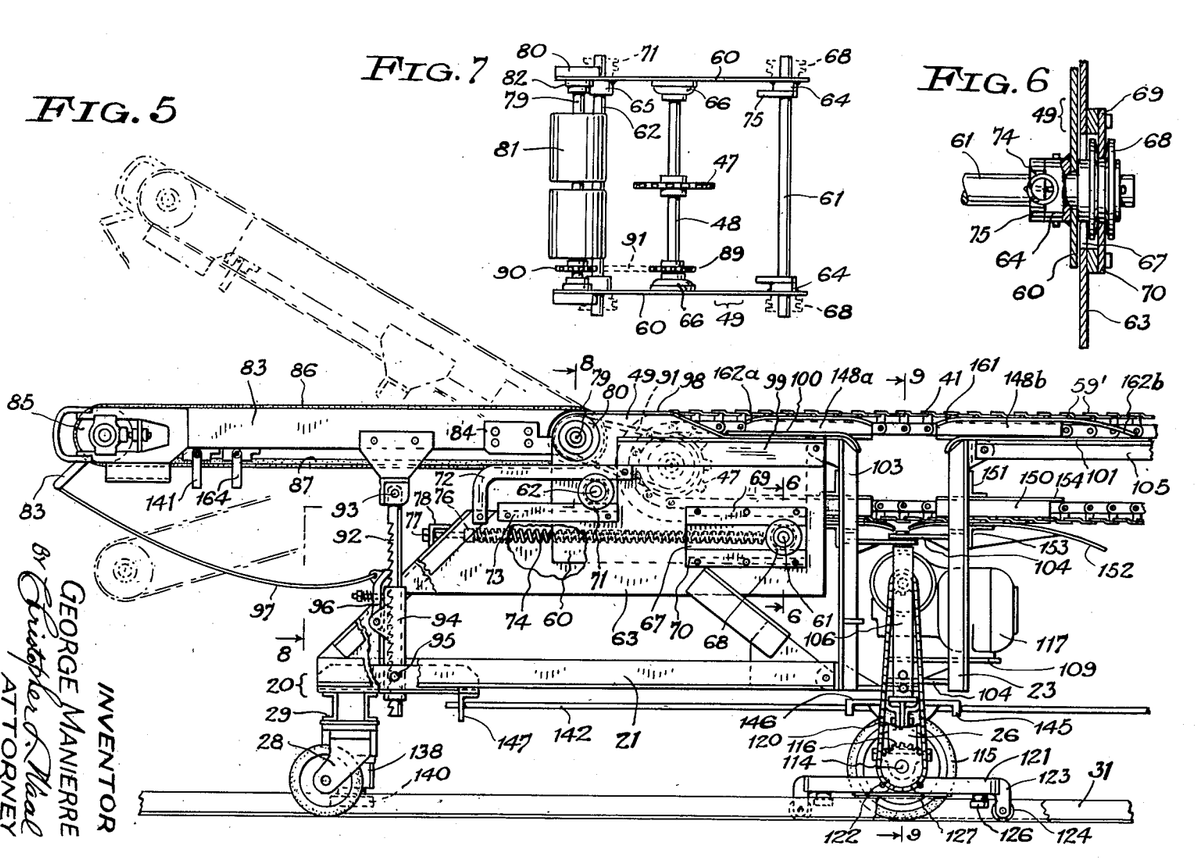
Fig. 5 is a side elevational view of an end portion of the machine, parts being broken away, and an end conveyer of the machine being shown in different positions in full and broken lines.
Fig. 6 is a detail sectional view of part of a roller mounting for a take-up carriage, taken generally on the line 6—6 of Fig. 5.
Fig. 7 is a top plan view of a conveyer take-up carriage.
Figure 8:
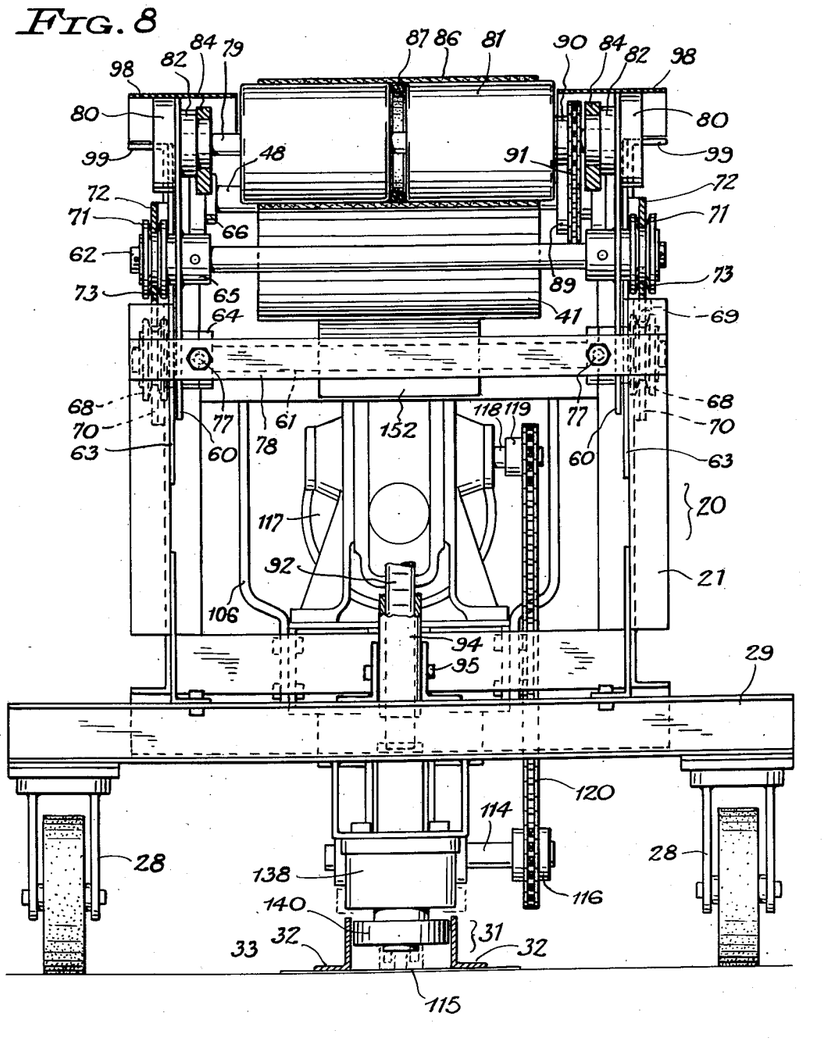
Fig. 8 is an end elevational view of the machine, parts being broken away and parts being shown in section on the line 8—8 of Fig. 5.

The take-up carriage 49 mounted in each end frame section comprises a pair of parallel vertical side plates 60 rigidly connected by horizontal cross rods 61 and 62 and slidably fitting between vertical side plates 63 forming part of the end frame section. The cross rod 61 is spaced inwardly from the sprocket shaft 48 and is disposed below the lower run of the conveyer chain, and the cross rod 62 is spaced outwardly from the sprocket shaft and is disposed at a lower elevation than the sprocket shaft. The rods are pinned or otherwise rigidly secured to respective collars 64 and 65 welded to the inner faces of the carriage side plates. The carriage side plates also support bearings 66 for the shaft 48 carrying the idler sprocket 47. The frame section side plates have horizontal slots 67 receiving the ends of the carriage cross rod 61. Grooved rollers 68 are rotatable on the ends of this cross rod and ride on horizontal upper and lower track bars 69 and 70 secured to the outer sides of the frame section plates 63, as seen in Figs. 5 and 6. Grooved rollers 71 are rotatable on the ends of the cross rod 62 and ride on horizontal upper and lower track bars 72 and 73 secured to the outer sides of the frame section plates, each bar 72 having a downturned outer end. Each take-up carriage 49 is urged outwardly to tension the associated conveyer chain, as by a pair of horizontally extending coiled springs 74 disposed near the side plates 60, the inner end of each spring being attached to an arm 75 on the adjacent collar 64 of the cross rod 61, and the outer end of each spring being secured to a nut 76 in which a tension bolt 77 is secured, the head of the bolt bearing on an apertured cross bar 78 forming part of the end frame section.

Each take-up carriage 49 is provided with a horizontal cross shaft 79 journalled at its ends in bearings 80 secured to the outer faces of the carriage side plates 60, the shaft 79 being spaced outwardly from the conveyer cross shaft 48 and upwardly from the cross rod 62 and carrying a roll 81 with axially spaced sections. The top of the roll 81 is at substantially the same elevation as the top surface of the upper run of the adjacent chain conveyer. Shouldered collars 82 are welded or otherwise secured to the inner faces of the carriage side plates coaxially of the cross shaft 79. A vertically swingable belt conveyer frame or boom 83 has eyed side bars 84 at its inner end pivotally mounted on the shouldered collars 82 against lateral displacement. A two-section idler roll 85 is adjustably carried at the outer end of the swingable conveyer frame 83. A belt conveyer 86, preferably of a rough-surfaced rubber type, is trained over the rolls 81 and 85 and is tensioned by the adjustable roll 85, the belt being slidably supported on the flat upper deck of the frame. The belt has a central, longitudinally extending rib 87 at its inner face adapted to fit loosely between the two sections of each roll to confine the belt against lateral displacement. The deck of the conveyer frame has a longitudinally extending slot 88 to provide clearance for the belt rib 87. The outer end of the frame 83 has a handle 83'.

Each belt conveyer 86 is suitably driven, preferably from the adjacent chain conveyer 41 or 42. Each chain conveyer shaft 48 and the adjacent belt conveyer shaft 79 are provided with respective sprockets 89 and 90 over which a transmission chain 91 is trained. The linear speed of the conveyer belts 86 is preferably slightly higher than the linear speed of the conveyer chains.

The outer end of each swingable belt conveyer frame 83 is movable through a suitable angle extending above and below a horizontal plane and is supported in adjusted position by a laterally notched or serrated strut 92. The take-up carriage and its tensioning means are so arranged as not to interfere with the angular adjustment of the belt conveyer frame. The strut at its upper end has a pivotal mounting 93 with the belt conveyer frame 83 and has its lower end portion slidable in a guide tube 94 pivotally secured by trunnions 95 to the lower part of the end frame section 21 or 22. The guide tube 94 carries a spring-pressed pawl 96 engaging the strut to hold it in adjusted position, the pawl being releasable by a pull cord 97 extending to the outer end of the swingable conveyer frame. In some instances, the supporting strut may be replaced by a hydraulic lift.

Each take-up carriage 49 is provided at opposite sides with guard plates 98 which are fastened to the upper edges of the carriage side plates 60. Between the vertical planes of the sprocket shaft 48 and belt conveyer roll 81 the guard plates extend at approximately the level of the upper surface of the conveyer chains. The inner end portions of the guard plates are offset downwardly and slidably rest on the top surface of horizontal top bars 99 of the end frame section. Guard plates 100 are secured to the frame top bars 99 and closely overlie the downwardly offset portions of the guard plates 98.

The frame sections 23 and 24 have longitudinally extending guard plates 101 which extend along the top portions of these sections at opposite sides of the upper runs of the chain conveyers, the guard plates having downwardly curved opposite ends. The frame section 25 has similar guard plates 102 which, however, have arched intermediate portions extending along the upper edges of the vertical frame plates 43'.

Horizontal flexibility is imparted to the articulated conveyer frame 20 through the pivotal connections between the ends of the adjacent sections. At each of these ends each frame section includes a vertical end frame 103 or panel of rectangular shape. Horizontal, apertured, upper and lower coupling ears or plates 104 are secured to each end frame, as by welding. When the sections are placed end to end the coupling ears of adjacent sections overlap each other and coact to provide means for pivotally connecting the adjacent sections.

The end frame sections 21 and 22 and the intermediate frame sections 24 and 25 are of rigid construction. Each intermediate frame section 23 is semi-rigid, that is the end frames thereof are pivotally joined by top link bars 105 permitting vertical hinging movement of this frame section, thus facilitating travel of the articulated wheeled frame over uneven surfaces. The rigid intermediate frame member 24 includes fixed top bars 105'.

Figure 9:
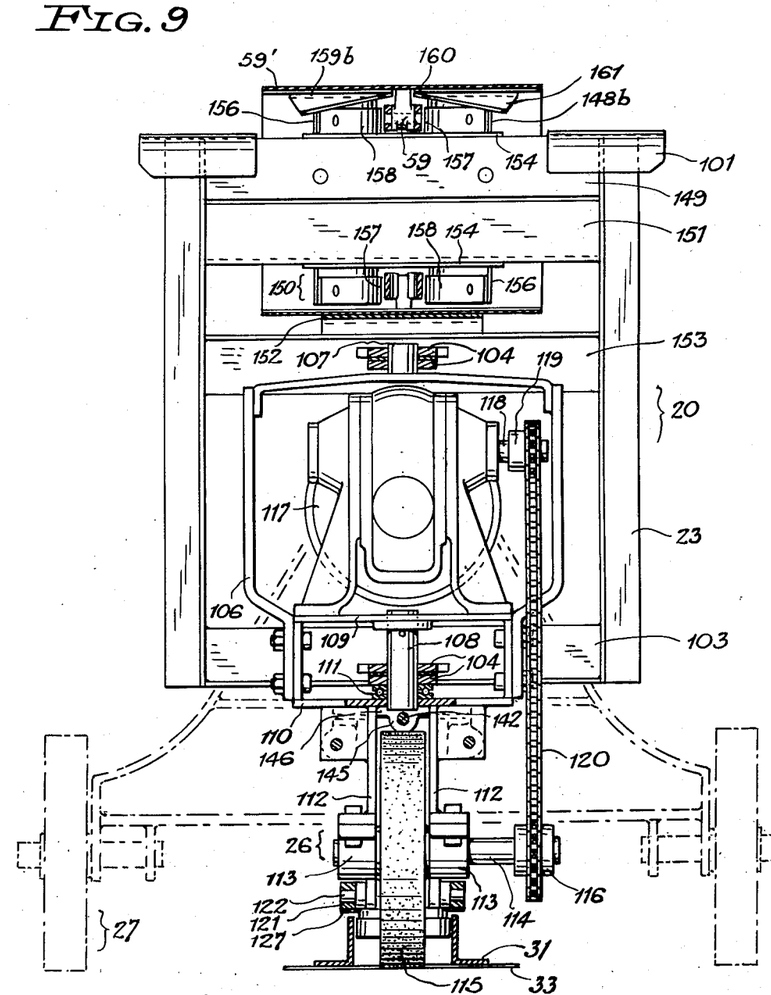
Fig. 9 is a transverse sectional view taken generally on the line 9—9 of Fig. 5.

Each power truck 26 has a loop-shaped vertical frame 106, Fig. 9, with aligned vertical stub shafts 107 and 108 extending through the upper and lower pairs of coupling ears 104. The truck frame includes vertically spaced horizontal plates 109 and 110 between which the lower stub shaft 108 extends, the lower coupling ears being disposed between these plates, and there being a ball thrust bearing 111 between the lowermost coupling ear and the lower plate 110. Parallel vertical plates 112 project downwardly from the horizontal plate 110 and are provided with shaft bearings 113 at their lower ends. A horizontal shaft 114 is journalled in the bearings 113 and carries a rubber-tired traction wheel 115 disposed between the vertical plates 112. The wheel shaft carries a sprocket 116 spaced outwardly from one of the bearings 113. A reversible gear-head traction motor 117 is mounted on a bracket-forming extension of the truck frame plate 109 and has a portion disposed within the loop-shaped truck frame, the motor having an output shaft 118 with a sprocket 119. A transmission chain 120 is trained over the motor sprocket 119 and the traction wheel sprocket 116 to drive the traction wheel in either direction.

Figure 10:
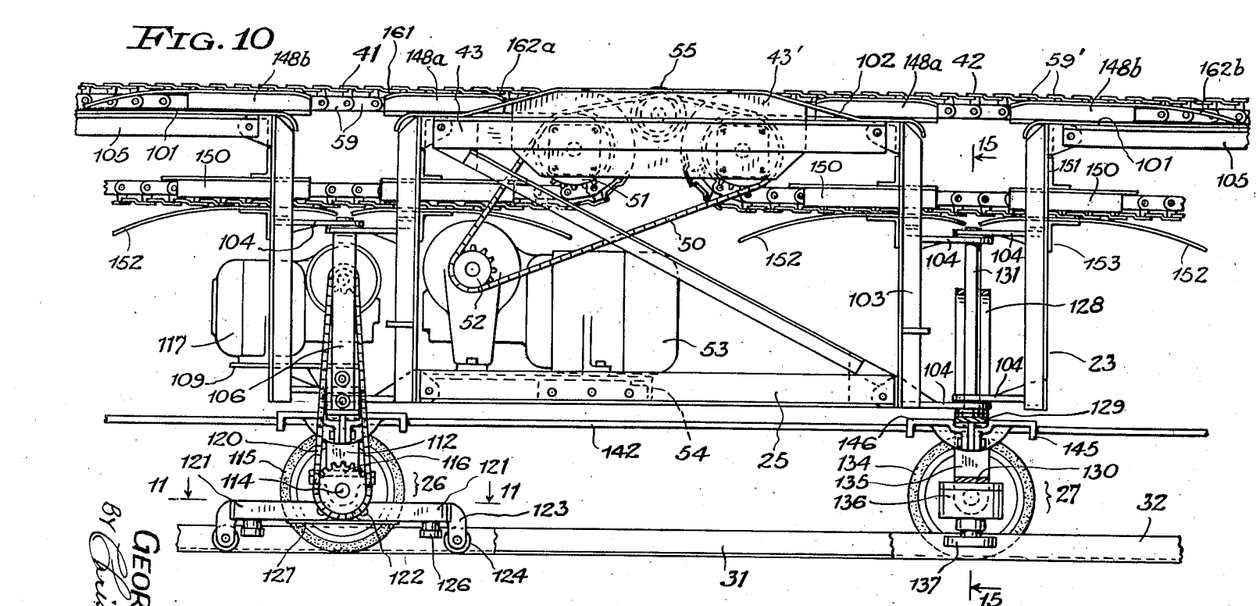
Fig. 10 is a side elevational view of an intermediate portion of the machine, parts being broken away and parts being shown in section.
Figure 11:
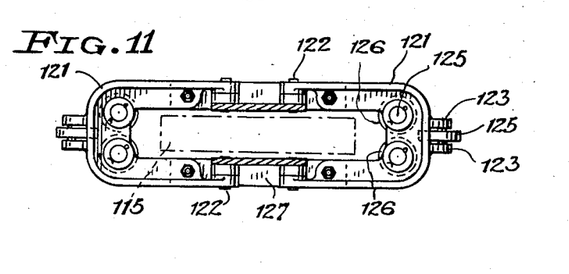
Fig. 11 is a top plan view of a guide roller mounting, parts being shown in section on the line 11—11 of Fig. 10.
Figure 12:
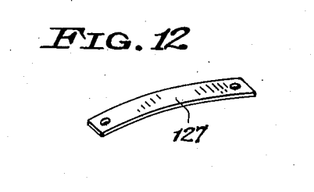
Fig. 12 is a detail perspective view of a biasing spring for the guide roller mounting.

A pair of U-shaped arms 121, Figs. 10 and 11, are pivotally secured at their inner ends to the wheel bearings 113 by parallel, horizontal pivot members 122 and extend therefrom in opposite directions longitudinally of the conveyer frame, the arms straddling the traction wheel 115. The outer end of each arm has a pair of vertical flanges 123 carrying between them a roller or wheel 124 rotatable on a horizontal axis, and near the outer end of the arm are a pair of laterally spaced vertical pins 125 carrying rollers 126 at their lower ends. The pivoted arms 121 are urged downwardly by biasing leaf springs 127 secured to the lower faces of the arms. The rollers 124 are adapted to ride on the floor or other supporting surface, and when the articulated conveyer frame extends along the trackways 31 and 34 the rollers 124 are disposed in the trackways and the rollers 126 are engageable with the side walls of the trackways.

Each idler truck 27 has an A-shaped vertical frame 128 with cross bars 129 and 130. A vertical shaft 131 is inserted in the flattened apex of the frame 128 and in the cross bar 129, the shaft extending through the upper and lower pairs of coupling ears 104. The lower ends of the A-shaped frame are provided with pairs of laterally spaced vertical flanges 132 to which are secured aligned horizontal stub axles 133 having rubber-tired wheels 134 rotatable thereon. Spaced vertical plates 135 connect the cross bars 129 and 130, and a bracket 136 is secured below the cross bar 130 and carries a guide roller 137 rotatable on a vertical axis. The roller 137 fits loosely in the trackways and is engageable with the side walls of the trackways.

The cross beam 29 of each end section of the articulated frame has secured therebelow at its middle portion a bracket 138 carrying a guide roller 140 rotatable on a vertical axis, this roller being movable in the trackways like the guide roller 137 of the idler trucks.

The several reversible traction motors are connected for simultaneous starting and stopping under the control of the operator, and as the power trucks are distributed along the articulated frame the machine can be smoothly maneuvered and the frame is relieved of abnormal stresses. The reversible traction motors for the machine are manually controlled by "dead man" switches 141 mounted on the swingable conveyer frames or booms 85 at the ends of the machine.

As in the machine disclosed in my Patent 2,250,933, means are provided to control the pivotal movements of the articulated frame and the wheeled supporting trucks. The control means comprises a resilient rod 142 of spring steel extending longitudinally of the frame immediately above the traction wheels 115. The rod 142 slidably extends through spaced lugs 145 formed on brackets 146 secured to the frame of each power truck and idler truck, and the end portions of the rod extend through cross bars 147 secured to the end frame sections 21 and 22. The rod 142 is secured at one point, as at one end or at any intermediate point. When the machine is traveling in a straight line, the rod 142 maintains the truck frames at right angles to the direction of travel. When the machine makes a turn the resilient rod 142 bows and maintains each truck frame in a plane bisecting the angle between adjacent sections of the articulated frame.

The upper and lower runs of each chain conveyer are slidably guided and laterally confined by guide means rigidly secured to the adjacent ends of the frame sections. The upper guide means comprises horizontally extending guide devices or tracks 148a, 148b and 148c which are generally similar and are rigidly attached to upper cross members 149 of the end frames or end panels 103 of the several frame sections. The lower guide means comprises horizontally extending guide devices or tracks 150 which are rigidly secured to cross bars 151 of the end panels. The flights 59' of the lower conveyer runs are slidably supported on guide plates 152 having downwardly curved opposite ends and secured to cross bars 153 of the end panels. The end frame sections 21 and 22 and the intermediate frame section 25 are provided with the guide devices 148a, the semi-rigid intermediate sections 23 are provided with the guide devices 148b, and the rigid intermediate section 24 is provided with the guide devices 148c.

Figures 17, 18, 19, 20, 21, 22:
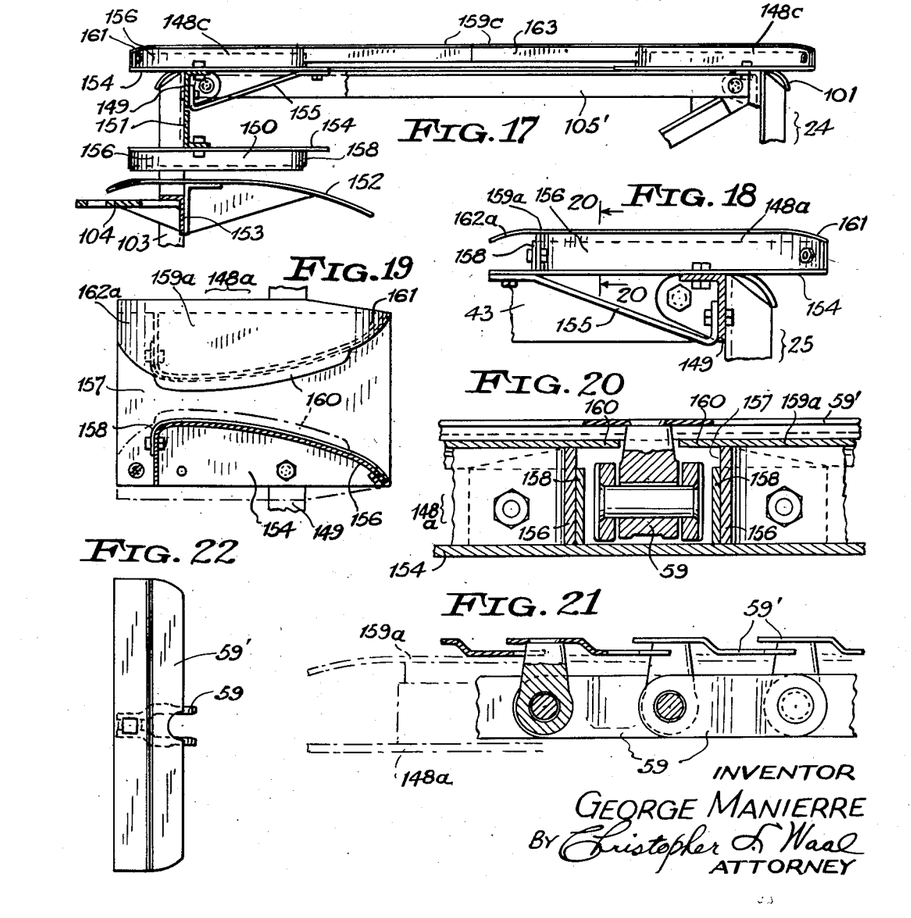
Fig. 17 is a side elevational view of the upper portion of the frame section of Fig. 16 parts being shown in section.
Fig. 18 is a side elevational view of an upper chain-guiding track member.
Fig. 19 is a top plan view of the track member of Fig. 8, parts being shown in section.
Fig. 20 is a detail transverse sectional view of the track member of Figs. 18 and 19, taken generally on the line 20—20 of Fig. 18, and showing an associated chain conveyer in transverse section.
Fig. 21 is a fragmental side elevational view of a chain conveyer of the machine, parts being shown in section.
Fig. 22 is a top plan view of a flight-carrying conveyer link.

Each of the guide devices 148a, 148b and 148c comprises a mounting plate 154 secured to the associated frame cross bar 149 and braced by a bracket 155, each pair of adjacent mounting plates partially bridging the space between adjacent frame sections. A pair of laterally spaced curved bars 156 are secured to the mounting plate and present vertical walls defining a central chain passage or throat 157 which is flared at opposite ends, the bars being provided with replaceable wear strips or liners 158 detachably bolted in place. Pairs of top plates 159a, 159b and 159c are secured to the upper edges of the throat-forming bars 156 of the guide devices 148a, 148b and 148c to slidably support the flights 59' of the upper runs of the chain conveyers and present longitudinally extending lips or flanges 160 along their spaced confronting inner edges to overlie the link portions of the chain conveyers. The top plates have downwardly bent or curved outer end portions 161, the lips 160 terminating at the bending lines of these end portions. The inner edges of the outer end portions of each pair of top plates flare outwardly, following the flare of the throat-forming bars 156, as seen in Fig. 19. The inner end portions 162a of each pair of the top plates 159a are likewise curved downwardly and have flared inner edges, the lips 160 terminating at the bending lines. By this arrangement the laterally flexible chain conveyers may be run in either direction without danger of interference. If desired, the plate end portions 162a may be slightly resilient.

Figure 13:
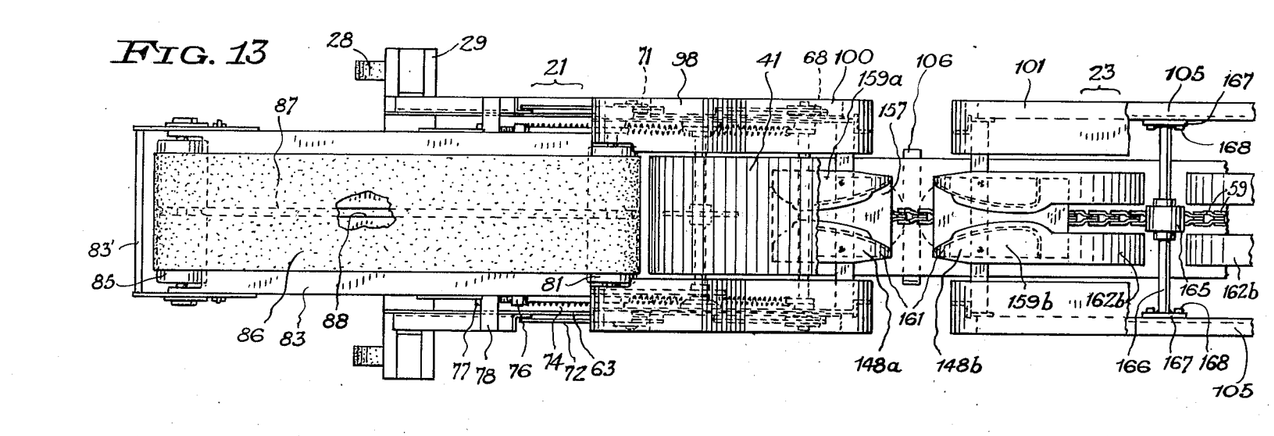
Fig. 13 is a top plan view of an end portion of the machine, parts being broken away.
Figure 14:
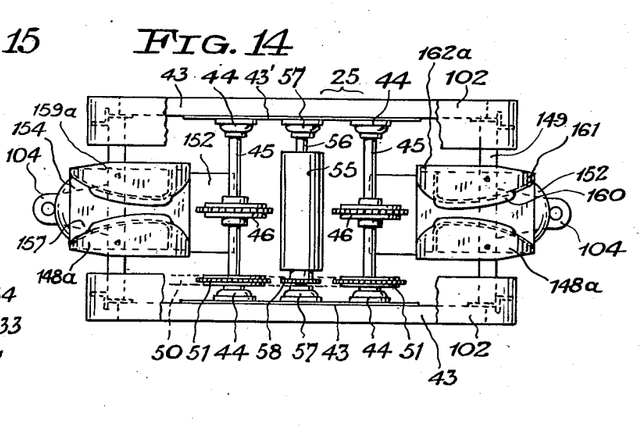
Fig. 14 is a top plan view of an intermediate frame section of the machine, the conveyer being omitted.
Figure 15:
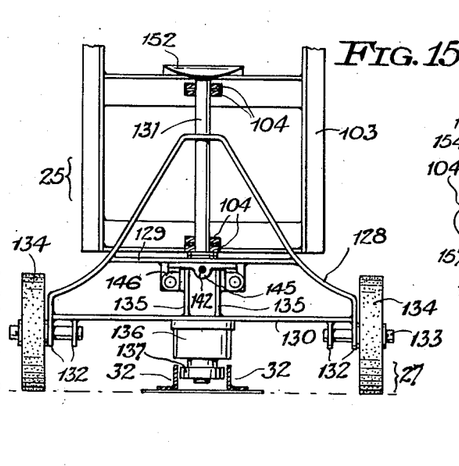
Fig. 15 is a fragmentary transverse sectional view of the machine, taken generally on the line 15—15 of Fig. 10.
Figure 16:
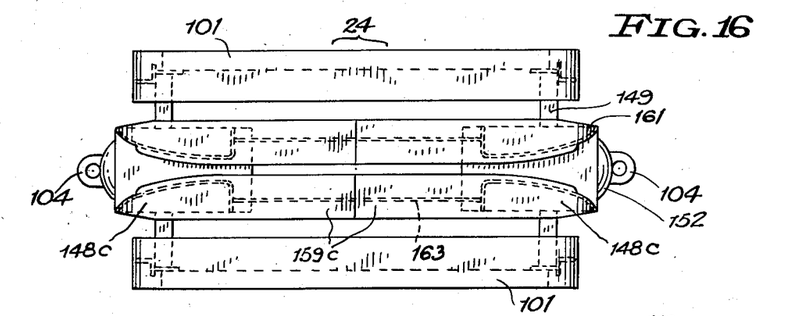
Fig. 16 is a top plan view of another intermediate frame section of the machine, the conveyer being omitted.

The inner end portions 162b of each pair of the top plates 159b of the chain guide devices 148b are likewise curved downwardly, but are somewhat longer, as seen in Fig. 13, the lips 160 of these top plates flaring outwardly at their inner ends adjacent to the bending lines. The plate end portions 162b are somewhat resilient. The chain guide devices 148c for the intermediate frame section 24 have respective pairs of laterally spaced top plates 159c, Figs. 16 and 17, which are connected at the middle of the frame section to provide a continuous top surface. The top plates are braced by a pair of parallel, longitudinally extending metal strips 163 which are welded or otherwise secured to the bottom faces of the top plates.

Each lower chain guide 150 includes a mounting plate 154 with throat-forming bars 156 and wear strips 158, but is open at the bottom, the construction being otherwise similar to that of the upper guides.

The reversible driving motor 53 for the chain conveyers 41 and 42 is manually controlled independently of the traction motors by means including manually operable switches 164 which are mounted on each of the swingable end conveyer frames 82, as seen in Fig. 5, permitting control of the chain conveyers from either end of the machine.

Figure 23:
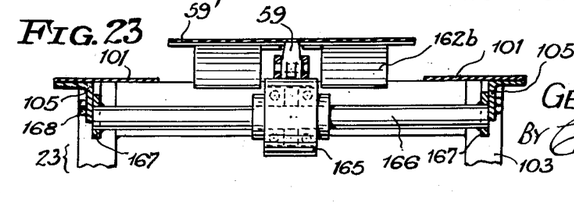
Fig. 23 is a detail transverse sectional view taken generally on the line 23—23 of Fig. 2.

Between the longitudinally spaced end tracks 148b of each hinged-type frame section 23, the chain portion of the upper run of each conveyer rides on a supporting roller 165, Figs. 13 and 23, rotatably carried on a non-rotatable cross shaft or cross bar 166 which is disposed midway of the length of the frame section and is secured at opposite ends to the hinged side bars 105 of the frame section. The ends of the cross shaft 166 are welded to vertical mounting plates 167 which are tightly secured to the side bars 105, as by bolts 168, thus rigidly tying these side bars together. This construction minimizes sagging of the upper run of each chain conveyer as it passes between the end tracks of the hinged-type frame section while this frame section is in various articulated positions.

In some instances, the universally flexible chain conveyers may be of the type disclosed in my above-mentioned Patent 2,250,933, thus reducing play at the pivotal connections of the chain links.

In some cases, a delivery chute 169 may be supported at the loading platform above the path of the conveyer machine to deliver articles onto the conveyer. The elevating end conveyers of the machine can be lowered to pass under this chute.

In the arrangement shown in Fig. 1, the articles A to be transferred to the conveyer are stacked alongside of the trackways 31. The articles may be loaded directly onto the chain conveyer 41 or they may be loaded onto the adjacent terminal belt conveyer 86 which may be adjusted to different elevations to facilitate loading.

When the conveyer machine is ready for operation, it stands on the loading platform 30 and extends along the trackways 31. After the box car 39 is spotted at the entrance of the loading platform, the hinged bridge plate 37 is swung down into the doorway of the car. The operator then starts the traction motors of the machine, and the machine moves along the trackways 31 and 34 into the car. The castered front end of the machine is then manually guided or steered for further movement into the car, as to the position shown in Fig. 1, and the traction motors are then stopped. The chain conveyer motor 53 has been previously started, or may be started after the machine comes to rest. The bags A are deposited onto the conveyer 41, either from the stack on the loading platform or from the chute 169, and are transported by the chain conveyers 41 and 42 to the terminal belt conveyer in the box car, the latter conveyer being adjusted from time to time to the desired elevation. As the bags are discharged from the belt conveyer they are stacked in the car, and as the stacking proceeds the machine is intermittently backed. After one end of the car is loaded, the conveyer machine is steered into the other end of the car and the loading of the car is completed. If adjacent box cars are to be loaded, they are loaded in such order that the car nearest the loading platform is loaded last. After the loading operation is completed, the conveyer means is stopped and the machine is returned to the loading platform.

When a car is to be unloaded, it is not necessary to reverse the conveyer machine end to end, since both ends of the machine are alike, and the machine can be loaded or unloaded at either end.

I claim:

1. In a conveyer machine, an articulated wheeled conveyer frame including an end section, a power-operated endless chain conveyer carried by said frame, take-up carriage means for said conveyer shiftably mounted on said end frame section, yieldable tensioning means urging said carriage means in take-up direction, track and roller means resisting both upward and downward displacement of said yieldably tensioned shiftable carriage means, and a power-operated extension conveyer pivotally mounted on said carriage means and shiftable therewith.

2. In a conveyer machine, an articulated wheeled conveyer frame including an end section, a power-operated endless chain conveyer carried by said frame, a take-up carriage for said chain conveyer rollably supported on said end frame section and shiftable longitudinally of said section, track means for said rollably supported carriage including portions resisting upward displacement of said carriage, yieldable tensioning means urging said carriage in take-up direction, and a power-operated extension conveyer pivotally mounted on said carriage and shiftable therewith.

3. In a conveyer machine, an articulated wheeled conveyer frame including an end section, a power-operated endless chain conveyer carried by said frame, a conveyer take-up carriage rollably supported on said end frame section and shiftable longitudinally of said section, track means for said rollably supported carriage including portions resisting upward displacement of said carriage, and yieldable tensioning means urging said carriage in take-up direction and including a horizontally extending tension spring supported on said end frame section, said spring having its inner end attached to the inner end portion of said carriage and having its outer end attached to said end frame section.

4. In a conveyer machine, an articulated wheeled conveyer frame including an end frame section, a power-operated endless chain conveyer carried by said frame, a conveyer take-up carriage rollably supported on said end frame section and shiftable longitudinally of said section, yieldable tensioning means urging said carriage in take-up direction, track means for said rollably supported carriage secured to said end frame section and including portions resisting upward displacement of said carriage, and a power-operated extension conveyer pivotally mounted on said carriage and shiftable therewith, said carriage including a pair of parallel rotatable members extending transversely thereof and spaced horizontally, said chain conveyer being trained about one of said rotatable members and said extension conveyer being trained about the other of said rotatable members.

5. In a conveyer machine, an articulated conveyer frame including an end frame section with spaced parallel side members, a power-operated endless chain conveyer carried by said frame, a take-up carriage for said conveyer disposed between said side members and including parallel side plates and cross members rigidly connecting said plates, spaced upper and lower track members carried by said side members, a rotatable member between said side plates supported by said carriage and having said conveyer trained thereover, means including rollers between said track members and engageable with said track members for rollably supporting said carriage on said frame side members, and yieldable tensioning means urging said carriage in take-up direction.

6. In a conveyer machine, an articulated conveyer frame including an end section with spaced parallel side members, a power-operated endless chain conveyer carried by said frame, a take-up carriage for said conveyer disposed between said side members and including parallel side plates and cross members rigidly connecting said plates, a rotatable member between said side plates supported by said carriage and having said conveyer trained thereover, means for rollably supporting said carriage on said frame side members, yieldable tensioning means urging said carriage in take-up direction, and a power-operated extension conveyer pivotally mounted on said carriage for shifting movement therewith and including a second rotatable member supported by said carriage in outwardly spaced relation to said first-named rotatable member.

7. In a conveyer machine, an articulated frame comprising a plurality of frame sections pivotally connected end to end and including an intermediate frame section, a pair of endless chain conveyers carried by said frame and extending in opposite directions from said intermediate frame section, said conveyers having the adjacent ends of their upper runs substantially in alignment, and reversible driving means for said conveyers carried by said intermediate frame section.

8. In a conveyer machine, an articulated frame comprising a plurality of frame sections pivotally connected end to end and including an intermediate frame section, a pair of endless chain conveyers carried by said frame and extending in opposite directions from said intermediate frame section, a pair of parallel, horizontal cross shafts journalled in said intermediate frame section in horizontally spaced relation and having respective sprockets over which said chain conveyers are respectively trained with their upper runs at the same elevation, and means carried by said intermediate frame section for driving said sprockets in either direction.

9. In a conveyer machine, an articulated frame including an intermediate frame section and opposite end frame sections, a pair of endless chain conveyers carried by said frame and extending in opposite directions from said intermediate frame section to said end frame sections, reversible driving means for said conveyers carried by said intermediate frame section, said conveyers having the adjacent ends of their upper runs substantially in alignment for transfer of articles therebetween during travel of said conveyers in either direction, and power-operated extension conveyers carried by both of said end frame sections.

10. In a conveyer machine, an articulated frame including an intermediate frame section and opposite end frame sections, a pair of endless chain conveyers carried by said frame and extending in opposite directions from said intermediate frame section to said end frame sections, reversible driving means for said conveyers carried by said intermediate frame section, said conveyers having upper runs substantially in alignment, and tensioning means for said respective conveyers carried by said end frame sections.

11. In a conveyer machine, an articulated frame including an intermediate section, a pair of horizontally spaced, parallel rotatable members carried by said section, a pair of endless conveyers carried by said frame and extending in opposite directions from said rotatable members about which said conveyers are respectively trained, a transfer roll rotatably carried by said section in the gap formed between said conveyers, and means for driving said roll in the same direction as said rotatable members and at a peripheral speed higher than the linear speed of said conveyers.

12. In a conveyer machine, an articulated conveyer frame including an end section, a power-operated endless chain conveyer carried by said frame and having an upper run, conveyer take-up carriage means shiftably mounted on said end section, first guard plates carried by said end section and extending along opposite sides of said conveyer run, and second guard plates carried by said carriage means and extending along opposite sides of said conveyer run, the first and second guard plates at each side of the conveyer run being arranged in tandem and having their adjacent end portions in relatively movable lapping relation.

13. In a conveyer machine, an articulated frame comprising a plurality of spaced apart sections pivotally connected end to end, an endless universally flexible chain conveyer mounted on said conveyer frame and including an upper run, power-operated means for driving said conveyer in either direction, and means for guiding said conveyer adjacent to the pivotal connections of said frame sections, said guiding means including a guide track having a pair of laterally spaced passage-forming side walls and a pair of laterally spaced conveyer-supporting top plates, each of said top plates having downwardly curved opposite end portions, the space between the inner edges of said top plates widening at each end portion of the track.

14. In a conveyer machine, an articulated conveyer frame including an intermediate frame section, a power-operated endless chain conveyer carried by said frame and having an upper run, said intermediate frame section having end members and link means pivotally connecting said end members, guide tracks for said conveyer run mounted on said end members, and roller means carried by said link means and supporting said upper conveyer run at a region intermediate said end members.

15. In a conveyer machine, an articulated mobile conveyer frame comprising a plurality of frame sections pivotally connected end to end, endless universally flexible chain conveyer means mounted on said conveyer frame, power-operated means for driving said conveyer means in either direction, vertically swingable extension conveyers carried by opposite end portions of said conveyer frame and cooperating with said chain conveyer means, and means for driving each extension conveyer in either direction in accord with the direction of travel of said chain conveyer means, each reversibly driven extension conveyer selectively forming a loading conveyer and a delivery conveyer, and each extension conveyer being swingable to an upwardly and outwardly inclined position.

References Cited in the file of this patent
UNITED STATES PATENTS

| | | |
|---|---|---|
| 1,006,790 | Reinbold | Oct. 24, 1911 |
| 1,149,647 | Harwood | Aug. 10, 1915 |
| 1,278,055 | Stuart | Sept. 3, 1918 |
| 1,585,601 | Rabe et al. | May 18, 1926 |
| 1,680,223 | Liggett | Aug. 7, 1928 |
| 2,250,933 | Manierre | July 29, 1941 |
| 2,624,444 | Casabona | Jan. 6, 1953 |
| 2,648,424 | Bateman | Aug. 11, 1953 |